United States Patent [19]

Kindig

[11] 4,449,289
[45] May 22, 1984

[54] AUTOMATIC SYSTEM AND METHOD FOR COMPRESSING COIL TURNS AND INSERTING INSULATORS IN SLOTS OF A SLOTTED STATOR CORE

[75] Inventor: Alan L. Kindig, Holland, Mich.

[73] Assignee: General Electric Company, Fort Wayne, Ind.

[21] Appl. No.: 365,936

[22] Filed: Apr. 5, 1982

Related U.S. Application Data

[63] Continuation of Ser. No. 173,052, Jul. 28, 1980, abandoned.

[51] Int. Cl.$^3$ ............................................. H05K 15/10
[52] U.S. Cl. ........................................ 29/596; 29/732; 29/734; 29/736; 29/792
[58] Field of Search ................. 29/596, 732, 734, 736, 29/792

[56] References Cited

U.S. PATENT DOCUMENTS

| | | | |
|---|---|---|---|
| 3,579,818 | 5/1971 | Arnold et al. | 29/596 |
| 3,909,902 | 10/1975 | Peters | 29/596 |
| 3,974,553 | 8/1976 | Reiger, Jr. et al. | 29/734 X |
| 4,026,009 | 5/1977 | Kindig et al. | 29/596 |
| 4,186,478 | 2/1980 | Hamune et al. | 29/596 |
| 4,216,571 | 8/1980 | Miller et al. | 29/596 |
| 4,349,956 | 9/1982 | Koenig | 29/596 |

*Primary Examiner*—Carl E. Hall
*Attorney, Agent, or Firm*—Ralph E. Krisher, Jr.

[57] ABSTRACT

Automatic system and method for compressing coil turns and insulators in stator core slots. Stator cores initially provided with end cuffed slot liners and a set of loosely inserted windings are loaded by the system operator sequentially into holding stations in a circular indexing, rotatable worktable. Each holding station comprises a cuff support assembly that serves simultaneously to precisely position and irremovably hold the stator cores as the worktable indexes the cores through a plurality of work stations. Automatic apparatus is provided at the work stations to initially press the turns into the slots, insert phase insulators, insert slot separator wedge insulators and further compress both the coil turns and insulators in the slots. A plurality of phase insulator work stations are gang operated to maintain high speed production rates despite relatively slow reloading of phase insulators into the insertion arbor of each work station. Angular orientation of the phase insulators in the stator core is preselectable remotely from the loading/unloading station of the system by means of selection of one of a plurality of sensor switches spaced about an arbor positioning switch plate at predetermined desired angular positions.

29 Claims, 13 Drawing Figures

AUTOMATIC SYSTEM AND METHOD FOR COMPRESSING COIL TURNS AND INSERTING INSULATORS IN SLOTS OF A SLOTTED STATOR CORE

This is a continuation of application Ser. No. 173,052, filed July 28, 1980, now abandoned.

BACKGROUND OF THE INVENTION

This invention relates to an automatic system and method for compressing coil turns and inserting insulators in the slots of a dynamoelectric machine. More particularly it relates to a system and method for pressing coil turns and inserting phase insulators and slot separator wedge insulators in a slotted stator core where the stator core is initially provided with slot liners terminating with protective end cuffs projecting from one or both end faces of the stator core and with at least one set of windings, such as the main windings, loosely inserted in the stator core slots.

The many processing steps involved in the manufacture of electric motors can require that the motor be handled manually many times as it progresses through individual steps of laminate construction, coil winding and insertion, insertion of slot liners and various phase insulators and slot separator wedge insulators. In order to reduce the manufacturing costs associated with repetitive handling and manual processing at each step it is desirable to provide as much automation as possible. An example of automated phase insulator insertion equipment is disclosed in copending application Ser. No. 91,081, filed Nov. 5, 1979 which issued Sept. 21, 1982 as U.S. Pat. No. 4,349,956 in the name of Fredrick Koenig and entitled "Methods And Apparatus For Feeding And Handling Electrical Phase Insulators For Dynamoelectric Machines" which is assigned to the assignee of the present invention and the disclosure of which is expressly incorporated herein by reference. Briefly, the disclosed apparatus loads prefabricated phase insulators onto a rotatable arbor which is then inserted into the stator bore where the insulators are ejected with connector legs of parallel phase insulators being pushed into preselected slots of the stator core. At the conclusion of the insulator insertion step, the insertion arbor is removed from the core and reloaded with a new set of phase insulators for the next stator core.

Another example of automated equipment is the slot separator wedge insulator insertion machine disclosed in U.S. Pat. No. 4,026,009 entitled "Apparatus And Methods For Aligning And Placing Insulating Members In Magnetic Core Slots" issued on May 31, 1977 in the names of Alan L. Kindig and Ronald H. Brown and assigned to the assignee of the present invention, the disclosure of which is expressly incorporated herein by reference. Briefly, an alignment and wedge guide arbor is inserted into a stator bore with wedge guides aligned with selected slots of the stator. Precut wedges are pushed through the guides into the slots. In an improvement disclosed in the patent, the wedges, during insertion, are retained against the slot teeth away from the coil turns by means of elongated spring wires extending the length of the slots. As the arbor and spring wires are removed, the resilient wedges return to their original shape and move into firm, non-twisted engagement with the coil turns in the slots.

These and other examples of individual automated equipment still require that the stator cores be manually handled while being transferred from one set of equipment to the other.

It is therefore an object of the invention to provide an automated system and method for the manufacture of slotted core dynamoelectric machines which will provide a series of automated processing steps without the necessity of manually handling the cores between steps and which obviates the disadvantages of present forms of semiautomatic manufacturing process steps.

It is another object of the invention to provide an automated system and method of the indicated type which accomplishes a plurality of manufacturing steps with a minimum amount of floor space being occupied and which can be operated conveniently by a single human operator.

It is a further object of the invention to provide an automated system and method that rapidly and reliably compresses previously inserted coil turns in the slots of a stator core, inserts phase insulators and slot separator wedge insulators and further compresses the coil turns with the insulators in the slots preparatory to subsequent insertion of additional coil turns in the slots.

It is a still further object of the invention to provide in an automated system of the type described, apparatus for reliably and positively retaining the stator core on a movable worktable as the core is moved through a series of manufacturing steps and further to provide a convenient means of indicating the presence of a stator core at each step of the manufacturing process to avoid false operation of the equipment involved at that particular manufacturing step.

Finally it is another object of the invention to provide an automated system of the type described which includes phase insulation insertion apparatus and which enables the operator of the system to remotely select and control the angular orientation at which the phase insulators are to be inserted into the stator from one of a plurality of selectable angular orientations corresponding to the specific model of dynamoelectric machine being manufactured.

SUMMARY OF THE INVENTION

Thus in accordance with one form of the invention there is provided an automatic system for compressing coil turns and inserting insulators in stator slots of a dynamoelectric machine which comprises, in part, a movable worktable having a plurality of stator holding stations spaced about the worktable wherein the stators initially include slot liners terminating in end cuffs projecting from each end face of the stator and at least one set of windings loosely inserted in the stator slots. A plurality of work stations are spaced about the worktable and include a combined loading/unloading station, an initial press station for compressing coil turns in the stator slots and for clearing coil end turns from the vicinity of the stator bore, at least one winding insulation insertion station, and a heavy press station for further compressing the coil turns with the inserted insulation in the stator slots. Means are provided for actuating the worktable to index the holding stations sequentially through the work stations in a repetitive manner. A cuff support assembly is mounted on the workable at each of a holding stations and is adapted to position and irremovably hold a stator loaded into the holding station while the stator is being indexed through the various work stations. Cuff support actuating means located at the loading/unloading station is operative by the operator of the system first to engage the cuff supports with the cuffs of a freshly loaded stator at the beginning of the indexing of the stator through the work stations and then to disengage the cuff supports from the stator cuffs after the stator has indexed through all the work stations so that the stator can be unloaded and a new stator loaded into the holding station.

Preferably a rotatable circular worktable is employed to minimize the amount of floor space occupied by the system. The work stations may include an automated phase insulator insertion station followed by a slot separator wedge insulator insertion station. In the case where the time period for loading of phase insulators onto insertion arbors substantially exceeds a desired relatively short index time between work stations (corresponding to a desired production rate), the desired index time is retained by employing two or more phase insulator stations and indexing the worktable to position fresh stators in each phase insulator station before simultaneously energizing the insertion arbors to insert phase insulators into the stator. The insertion arbors are then removed from the stators and reloaded with a new supply of phase insulators during the time period involved for the multiple indexing steps required to bring fresh stator cores into each of the phase insulator stations.

A particularly advantageous feature of the invention resides in the use of a cuff support assembly at the holding station to serve simultaneously as a support for the stator core and as a positive clamp or holding mechanism for the core to retain the core precisely and affirmatively in the required position for the precision operations performed in the various work stations.

BRIEF DESCRIPTION OF DRAWINGS

The subject matter which is regarded as the present invention is particularly pointed out and distinctly claimed in the concluding portion of the specification. The invention itself, however, taken with further objects and advantages thereof, may best be understood by reference to the following description taken in conjunction with the accompanying drawings in which:

FIG. 12 is a detailed side view of a portion of a phase insulator insertion apparatus useful in the FIG. 1 system.

DETAILED DESCRIPTION

Figure 1:
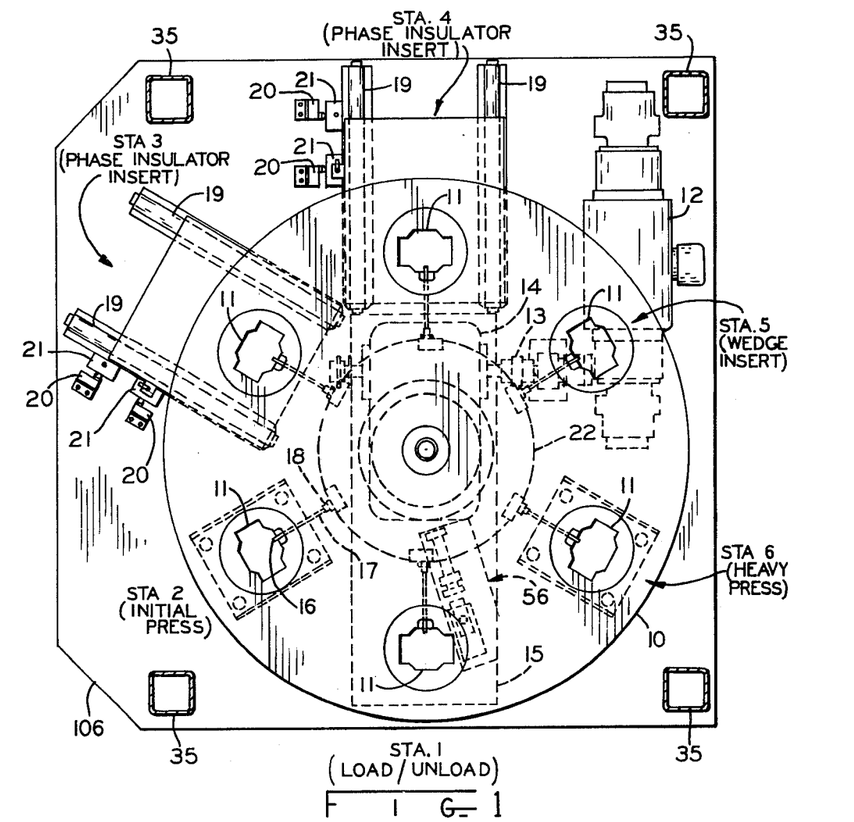
FIG. 1 is a top plan view of a system constructed in accordance with the teachings of the invention, and viewed at approximately the midpoint of the height thereof.
Figure 2:
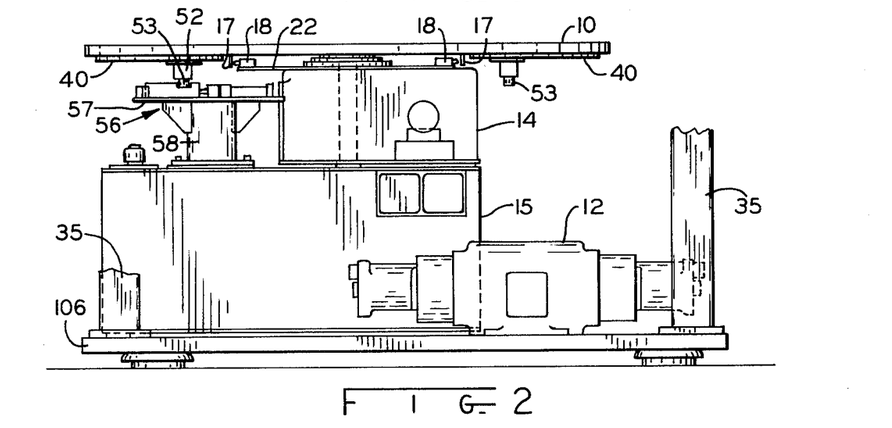
FIG. 2 is a side elevational view of the lower half of the system of FIG. 1.

Referring jointly to FIGS. 1 and 2 there is shown an automated system for compressing coil turns and inserting insulators in stator slots of a dynamoelectric machine. The system is adapted to receive partially assembled stator cores in which slot liners have already been inserted, the slot liners terminating at one or both ends thereof in end cuffs of a conventional nature which extend from the respective end faces of the stator core. In addition, it is assumed that the stator core has at least a first set of windings, such as a pair of main windings, which have been loosely inserted by means of any suitable coil insertion apparatus. The preferred operation of the system of the present invention, then, is to compress or compact the coil turns in the stator slots and to insert insulation pieces, preferably phase insulators and slot separator wedge insulators, preparatory to later insertion of auxiliary windings and final end turn formation in other forms of suitable apparatus. In the FIG. 1 embodiment, a six work station system is employed in which station 1 is a loading/unloading station at which an operator loads a fresh stator core into stator holding stations 11 formed on a circular, rotating worktable 10. Station 2 is an initial press station in which end turns of the loosely inserted coils are cleared away from the immediate vicinity of the stator bore and the winding coil side turns in the stator slots are initially compressed or compacted toward the ends of the stator slots preparatory to subsequent insertion of phase insulator insulator pieces in one of work stations 3 or 4 and of slot separator wedge insulator pieces in work station 5. Work station 6 is provided with press apparatus similar to that employed at station 1 to further compress or compact the coil turns in the stator slots along with the just-inserted insulator wedges and the connecting leg portions of the phase insulators.

Six stator holding stations 11 are formed on the worktable 10 spaced to coincide with each of the work stations 1–6. Means for actuating worktable 10 to index the holding stations 11 through the six work stations includes drive motor 12, coupling 13, and an indexing transmission 14 of any suitable design such as, for example, a commercially available Ferguson intermitter. Transmission rotates worktable 10 in a stepwise manner such that, when at rest, the holding stations 11 are positioned in alignment with one of the work stations 1–6. Worktable 10 and transmission 14 are supported by a tank structure 15 which also conveniently serves as an oil reservoir for various hydraulic controls and actuators used to operate the equipment at each of the work stations 1–6. At each of the holding stations 11, a feeler cam and push rod linkage 17 are provided to sense the presence of a stator core loaded into position at load-/unload station 1. Feeler cam 16 which projects into the stator receiving cavity of holding station 11 and linkage 17 are mounted on the worktable 10 and rotate therewith. A stator presence sensor switch 18 is mounted at each work station on platform 22 and is coupled to suitable control circuitry such that when switch 18 is engaged and depressed by the extended linkage 17, the equipment at the associated work station is enabled to operate in normal manner.

As illustrated in FIG. 1, a pair of phase insulator insertion work stations 3 and 4 are included. The reference to work stations throughout the specification and claims of this case shall be understood to refer variously to a position about worktable 10 and/or to the functional apparatus associated with the manufacturing step performed at that location. For convenience in set up and maintenance at the phase insulator work stations, the respective apparatus is mounted in tracks 19 to be movable away from worktable 10. Electrical interlock switches 20 are provided alongside the tracks to assure that the phase insulator equipment is correctly located in either the forward (normal) position or in the retracted (set up/maintenance) position in order to be operable. Mechanical locks 21 are also provided to assure that the apparatus is held in place and do not accidentally move out of position on the tracks 19.

Figure 3:
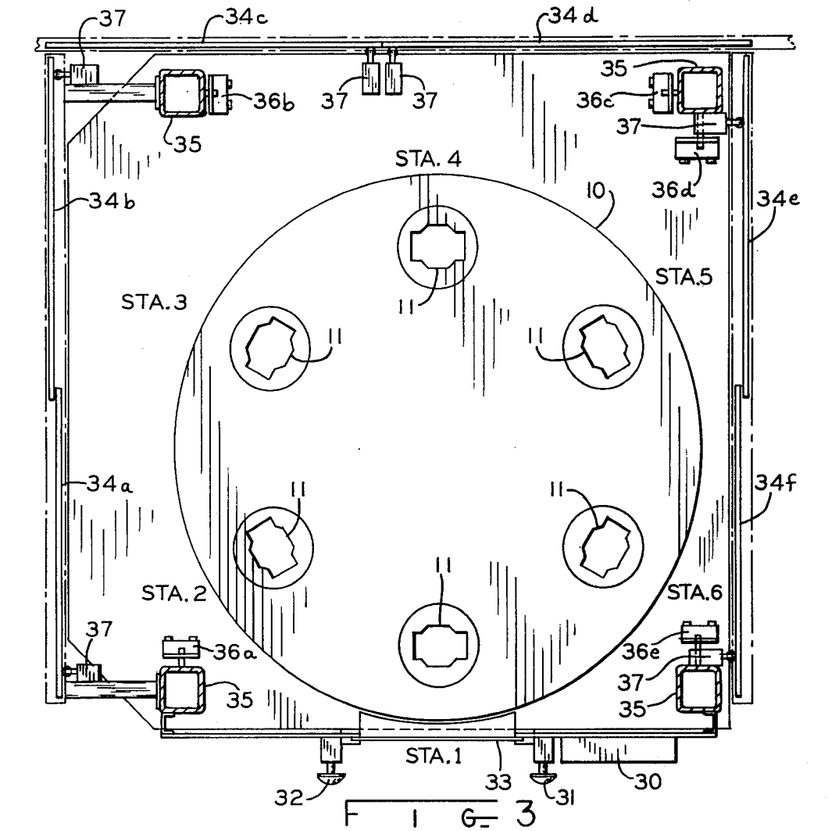
FIG. 3 is a top plan view of portions of the FIG. 1 system as viewed from a point near the top thereof.

In FIG. 3, there is shown the location of the operator controls including a master operator control panel 30 and the dual hand operated switches 31, 32, the latter comprising a well known safety feature to assure that the operator's hands are away from the moving components of the machine during its normal operation. In addition, a sliding safety shield 33 is provided to close off the access to the loading/unloading station during operation of the equipment. On each of the corner support posts 35 there is mounted an auxiliary set-up and maintenance control panel 36a–e for each of the work stations located around the worktable 10. Surrounding the entire system is safety cage including sliding steel mesh doors 34a–f which provide visual access to the interior of the system while preventing physical intrusion. Each sliding door 34a–d is provided with a safety interlock control switch 37 which, when the corresponding door is opened, disables the normal control of all the work stations from the master control panel 33 and enables operation of the work station by its respective control panel 36. Thus opening of door 34a would disable normal operation of the system from the master control panel 30 and enables control of the initial press work station 2 from auxiliary control panel 36a.

Figure 6:
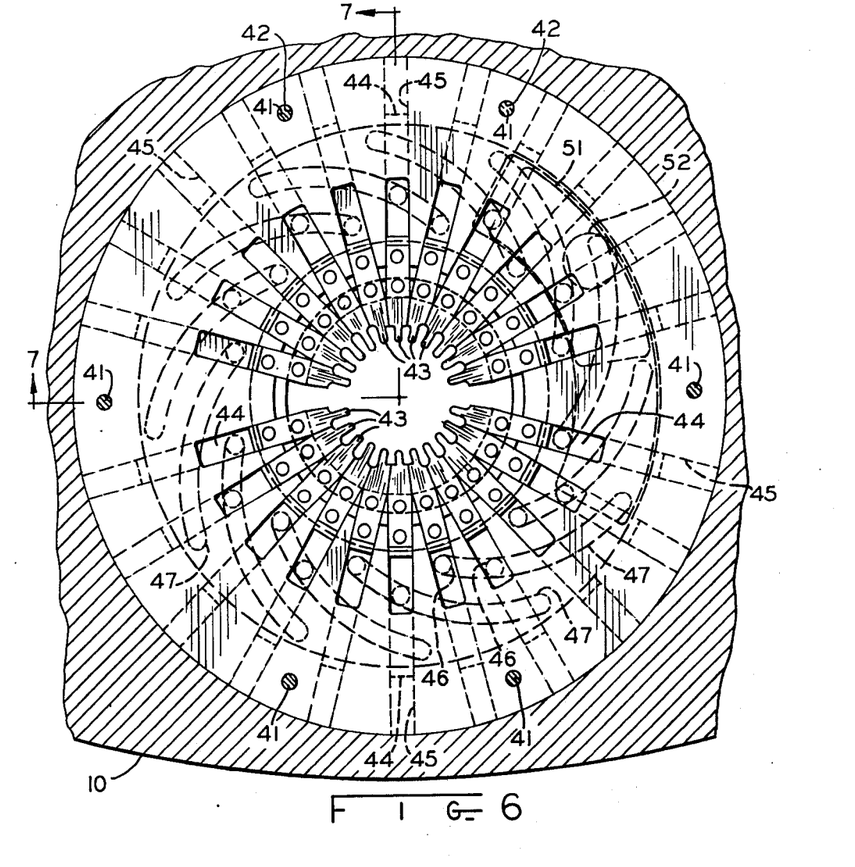
FIGS. 6 and 7 are top and side views, respectively, of a cuff support assembly useful in the construction and operation of the FIG. 1 system.
Figure 7:
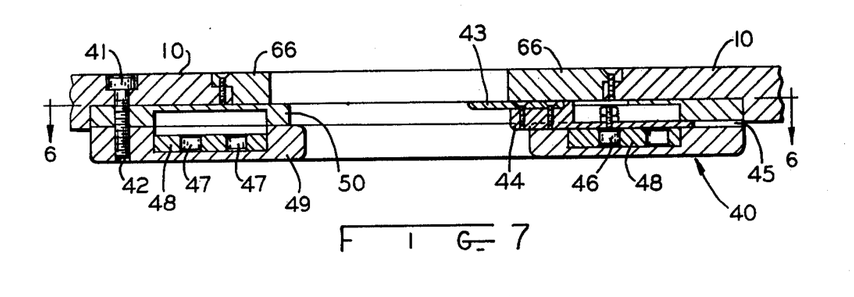

Referring jointly to FIGS. 1 and 6–7, in accordance with one important aspect of the invention, a cuff support assembly 40 is mounted on the worktable 10 at each stator holding station 11, the cuff support assembly 40 being adapted to position and irremovably hold a stator loaded into the holding station 11 while the stator is being indexed through the various work stations 2–6. As best seen in FIGS. 6 and 7, cuff support assembly 40 is mounted to the underside of worktable 10 by bolts 41 extending through bolt holes 42. Assembly 40 comprises a plurality of radially movable cuff support fingers 43 attached to carriers 44 which are nested in guide channels 45. Each carrier 44 has a carrier cam follower 46 which rides in arcuate cam slots 47 formed in a cam ring 48. The cuff support carriers 44 and cam ring 48 are sandwiched between a cuff support guide plate 49 and a cover plate 50. The cuff support assembly 40 is completed by a mounting plate 51 which is attached to the cam ring 48 and which has depending therefrom an actuator column 52 and actuator cam follower 53.

Figure 8:
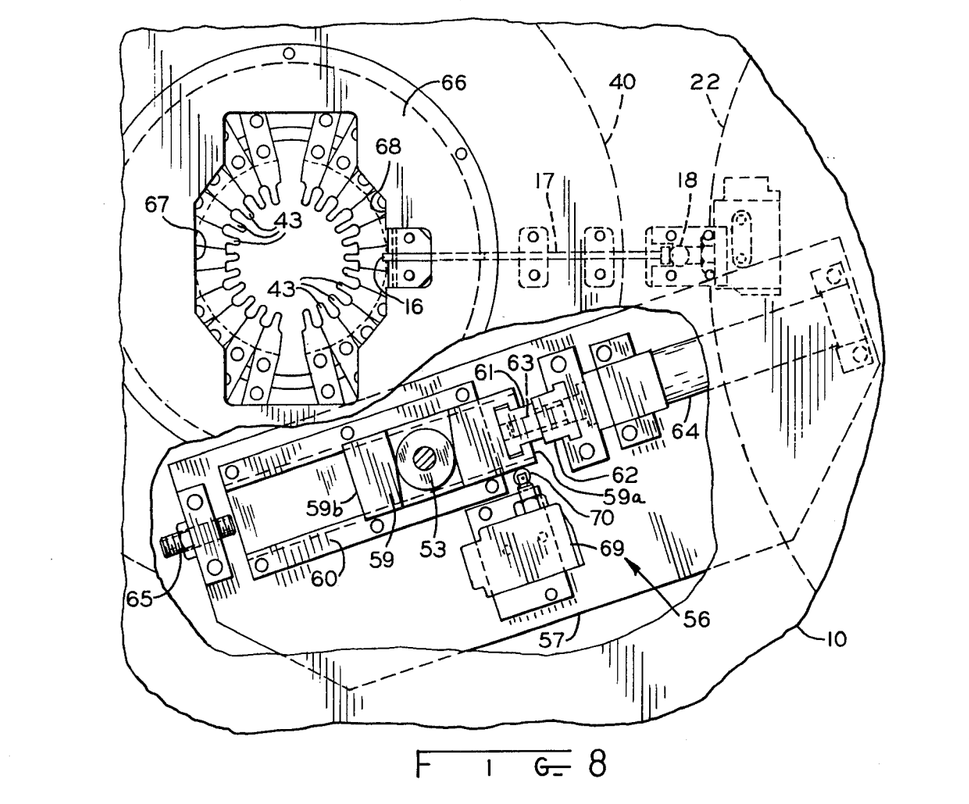
FIGS. 8 and 9 are top and side views, respectively, of actuation means useful in conjunction with the cuff support assembly of FIG. 6.
Figure 9:
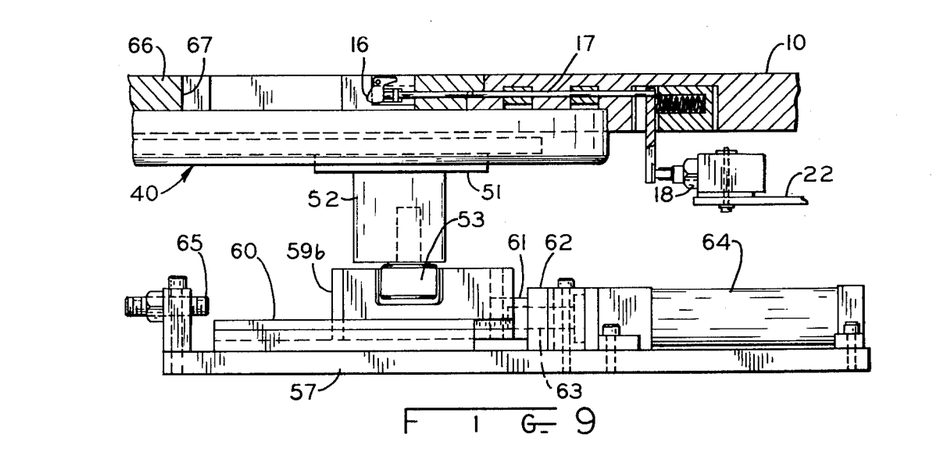

Means 56 for actuating the cuff support assembly 40 is located at loading/unloading station 1 and is operable from the master control panel 30 for manual operation. For automatic operation cycle buttons 31 and 32 are simultaneously activated to concurrently close safety door 33 and to cause the cuff support fingers 43 to engage the cuffs (not shown) of a freshly loaded stator at the beginning of the indexing of the stator through the work stations 2–6. The cuff supports are automatically disengaged from the cuffs after the stator has been indexed through the work stations 2–6 so that the stator may be unloaded and a new stator loaded into the holding station. Referring jointly to FIG. 2 and FIGS. 8 and 9, the actuator means 56 is mounted on a platform 57 atop pedestal 58 and includes a push-pull slider block 59 riding in a guide channel 60 with end 59a being secured by a coupler 61 to the actuator ram 63 of an hydraulic cylinder 64. In order to provide an adjustment for the extent of the radially inward movement of the cuff support fingers 43 thereby to adjust to different size stators, a replaceable stop block 62 is provided between coupling 61 and hydraulic cylinder 64. By selection of the appropriate length of the stop block inserted over the actuator ram 63, the stop position of the ram 63 and slider block 59 can be preselected to readily adjust the positioning of the cuff support fingers relative to the size of the stator in the holding station. An optional adjustment screw and lock nut arrangement 65 is provided at the extended position of the actuator ram 63 to engage the opposite end 59b of slider block 59 so as to provide adjustment of the retracted position of the cuff support fingers 43. While this latter adjustment may be considered desirable it is not essential since it is merely necessary that the fingers 43 be retracted by an amount sufficient to clear the stator cuffs to permit the operator to unload the stator from the holding station 11. It is another important feature of the invention that the cuff support fingers, in the retracted position extend into the cavity of the holding station (FIG. 7) to provide a base support for the stator when it is initially loaded into the holding station 11. Additionally, a removable stator alignment insert plate 66 having suitable flat surfaces 67 and 68 to conform to the shape of the specific stator involved may be provided in holding station 11 to assist the operator in properly orienting the stator as it is being loaded into the station. A sensor switch 69 is mounted on platform 57 with feeler wheel 70 bearing on the sides of slider block 59. The position of switch 69 is such that when ram 63 is in its retracted position, corresponding to the closed and locked position of cuff support fingers 43 against the stator cuffs, the switch 69 provides a signal to the control circuit of the system indicating satisfactory closure of the cuff supports thus permitting the system to index the stator toward work station 2.

Figure 4:
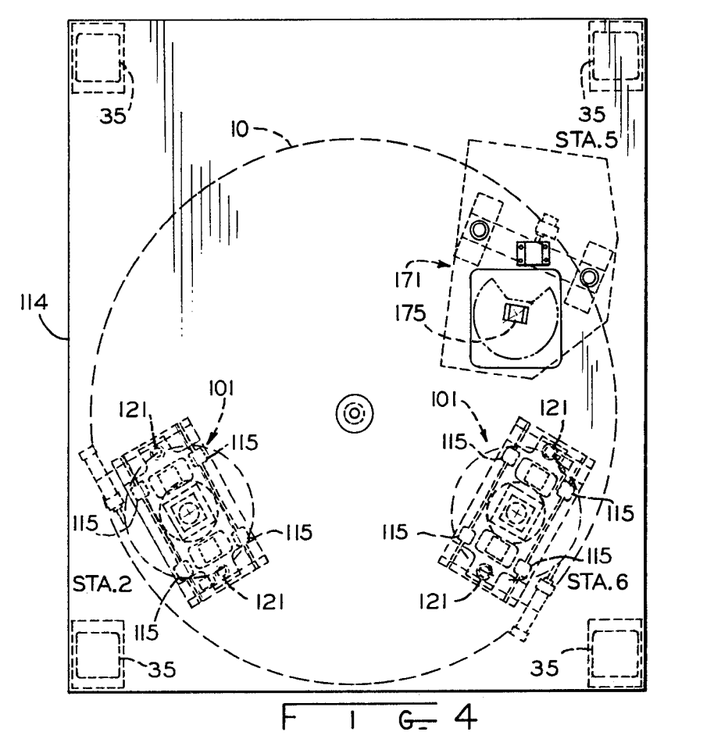
FIG. 4 is a schematic top plan view of the system of FIG. 1 illustrating the placement of certain work stations thereof.
Figure 5:
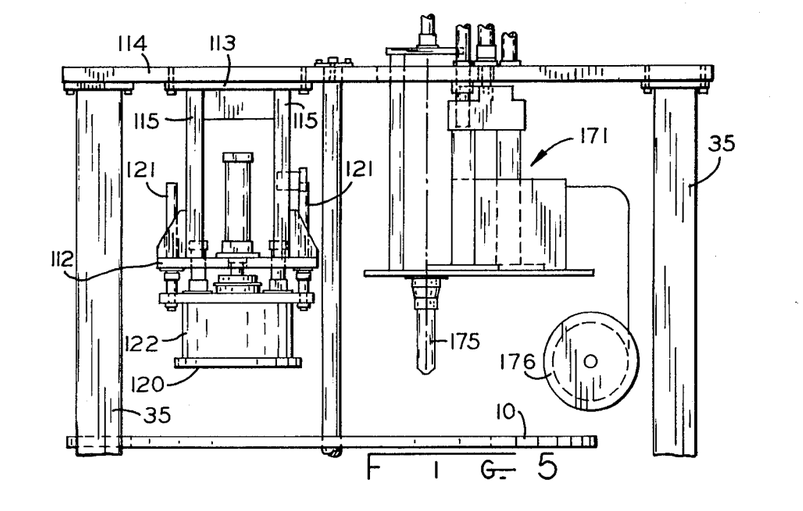
FIG. 5 is a side elevation view of a portion of the FIG. 1 system illustrating certain of the work station equipment located in the upper half of the system.
Figure 10:
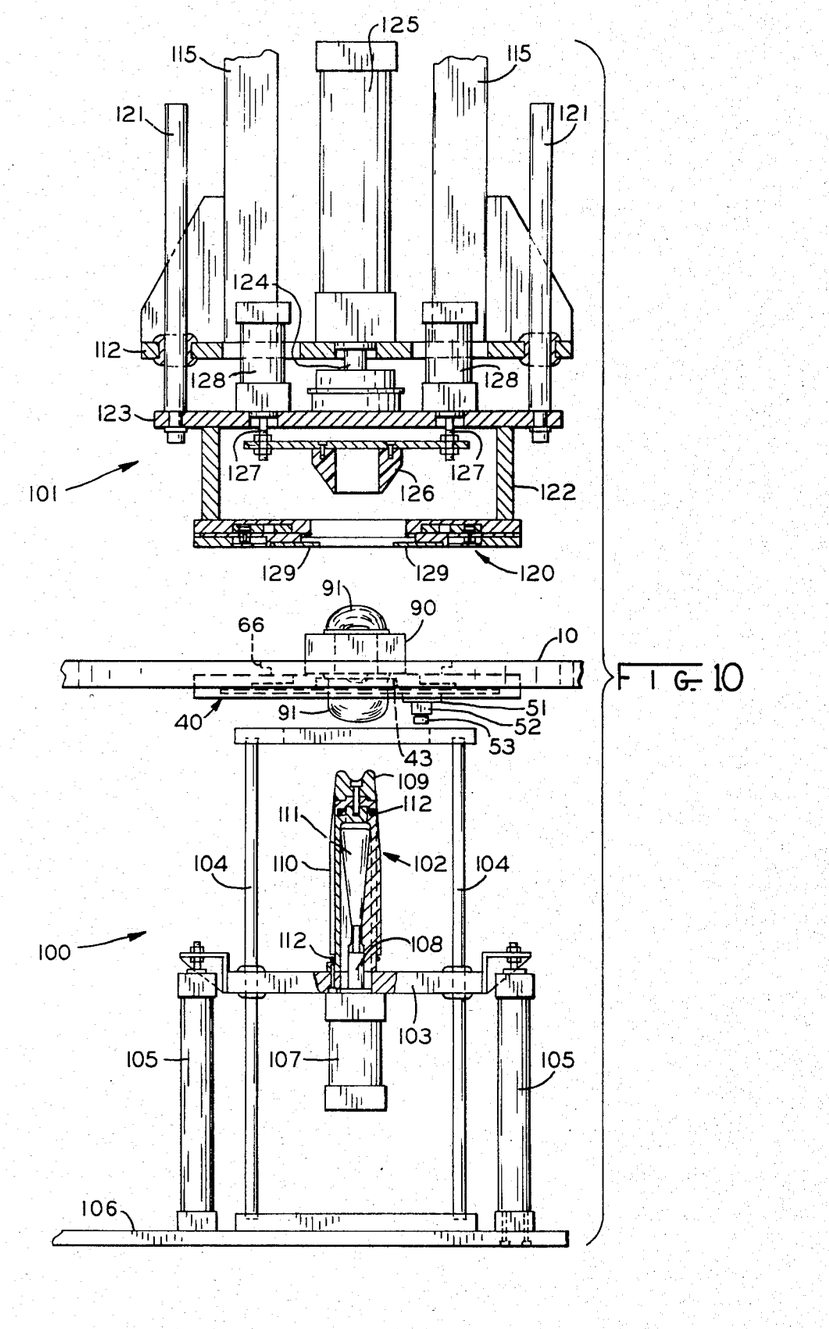
FIG. 10 is a partial side elevation view of a press station useful in conjunction with the system of FIG. 1.

Referring to FIGS. 4, 5 and 10, wire press apparatus is illustrated which is usable as both work station 2 and work station 6 in accordance with a further important feature of the invention. As seen in FIG. 10, a stator core 90 with loosely inserted windings 91 is loaded in position on cuff support assembly 40 in a manner previously described and is indexed into position between a lower press section 100 and upper press section 101. Lower section 100 includes press arbor 102 secured at its lower end to a platform 103 which is vertically along guide rods 104. Each end of platform 103 is secured to actuator rams of hydraulic cylinders 105 so as to be vertically movable to insert arbor 102 into the bore of stator 90. The entire lower section of the press work station is mounted on a floor mount base 106 which is common to the entire system (FIGS. 1 and 2). Hydraulic cylinder 107 is secured to the under side of platform 103 with it actuating ram coupled to rod portion 108 of arbor 102. The arbor insert nose or top portion 109 may be wedge shaped as when viewed from the side of the view shown in FIG. 10 to facilitate entry of the arbor 102 past the bundle of loosely formed bottom end turns of windings 91 into the bore of stator 90. Except for the wedge shape of the top portion 109, the structure and operation of arbor 102 in pressing coil turns in the stator slots is the same as that shown and described in U.S. Pat. No. 4,003,116 entitled "Apparatus for Setting Insulators and Pressing End Turns" issued Jan. 18, 1977, in the name of Richard W. Bale and assigned to the assignee of the present invention which disclosure is expressly incorporated herein by reference. Briefly stated, after arbor 102 is inserted into the stator bore with press blades 110 aligned with the proper slots of the stator, hydraulic cylinder 107 is actuated to pull an internal cone-shaped cam 111 down to force blades outward into the stator slots thus compressing the wire turns in the slots toward the closed ends of the slots. The cone cam is then extended upwards and blades 110 are retracted from the stator slots by the restoring force of a pair of garter springs surrounding the upper and lower ends of blades 110. Following this, the hydraulic cylinders retract platform 103 to withdraw arbor 102 from the stator bore.

Prior to insertion of arbor 102 into the stator bore, the upper section 101 of the press work station is actuated to bring upper cuff support assembly 120 into engagement with the upper cuffs on the stator core 90. Upper section 101 includes a support platform 112 suspended by posts 115 from an upper support plate 113 which is attached to the top structure portion 114 of the system. Portion 114 in turn is mounted on corner support columns 35. Cuff support assembly 120 is attached to guide rods 121 and to cylindrical chamber wall 122. The upper end of chamber wall 122 is attached to a support plate 123 which in turn is secured to the end of actuating ram 124 of hydraulic cylinder 125. Inside cylindrical wall 122, a vertically movable end turn press segment 126 is attached to actuating rams 127 of hydraulic cylinders 128. Segment 126 is provided with a hollow bore to allow entry of arbor 102 during the press operation.

When a stator core 90 has been correctly indexed into position in the press work station as shown in FIG. 10, the first operation to occur is the actuation of hydraulic cylinder 125 to lower cuff support assembly until cuff support fingers 129 engage the upper end face of stator 90. Cuff support assembly is of the same basic structure and operation as the previously described cuff support assembly 40. Upon reaching stator 90, an hydraulic cylinder (not shown) is actuated to close fingers 129 onto the upper cuffs of stator 90. At this point all the upper and lower cuffs of stator are fully supported by respective cuff support fingers before any press action is performed thus assuring proper support during the entire press operation. Cylinders 105 are actuated to raise arbor 102 into stator bore and cylinder 107 is actuated to lower cam 111 to force press blades 110 into the stator slots. Simultaneously, end turn press segment 126 is lower to gently move the end turns of windings 91 outwardly so as to clear the end turns from the vicinity of the stator bore. At this stage the press operation is completed and arbor 102 is withdrawn following which end press segment 126 is raised and cuff support assembly 120 is actuated to retract fingers 129 from the upper cuff and the assembly 120 is raised in preparation for indexing stator 90 to the next work station 3 where apparatus is provided for automatically inserting phase insulators.

Figure 11:
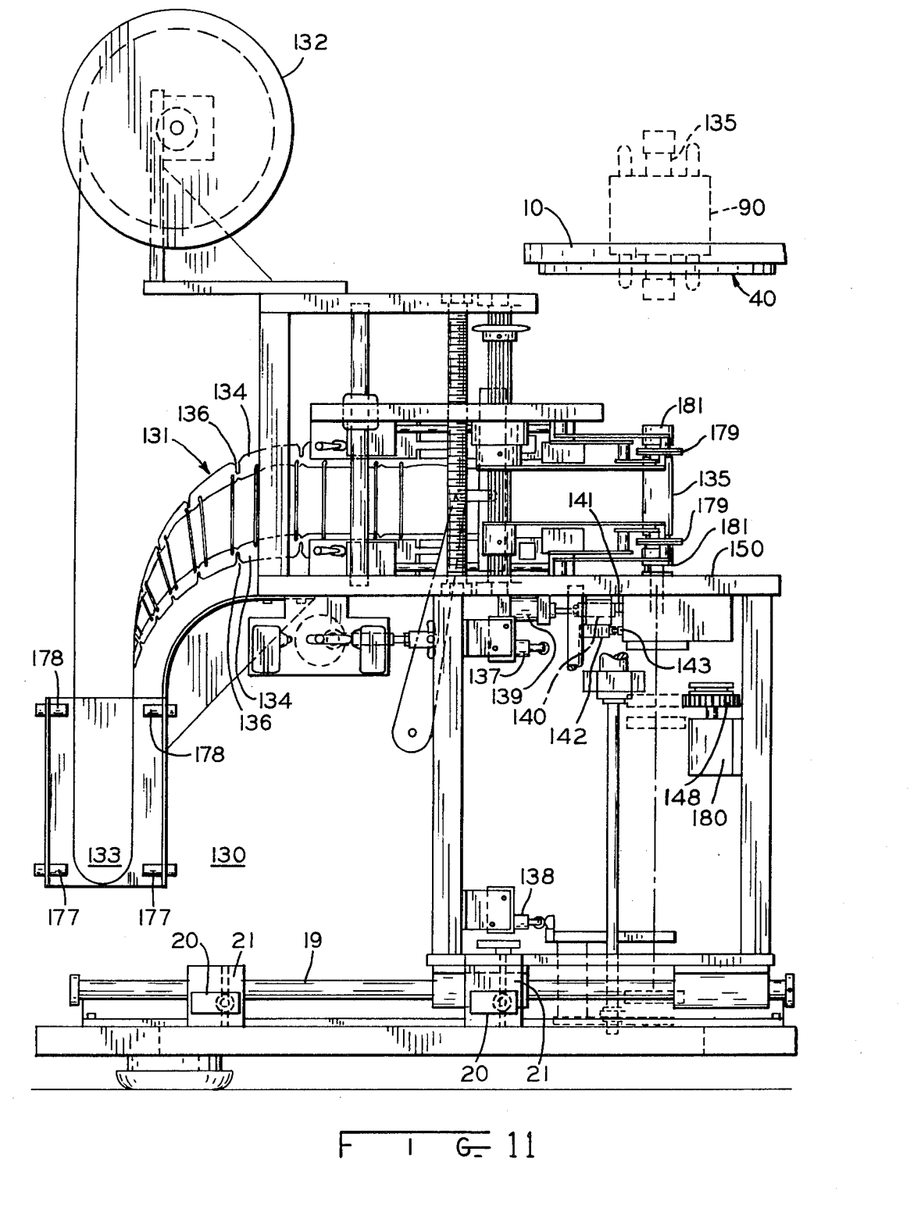
FIG. 11 is a partial side elevation view of a phase insulation insertion machine useful in the system of FIG. 1.

Referring to FIG. 11, representative there is shown apparatus for inserting phase insulators which may be used in each of work stations 3 and 4. The structure and operation of apparatus 130 are essentially the same as disclosed in the aforementioned Koenig application Ser. No. 91,081 except principally for the insertion arbor indexing apparatus described hereinafter with reference to FIGS. 12 and 13. Briefly, however, as shown in FIG. 11, chain 131 of phase insulators is fed from a suitable supply such as reel 132 into the apparatus 130. The chain 131 is advanced intermittently in apparatus 130 and, for this reason a loop 133 of the insulator chain 131 is maintained between the reel 132 and apparatus 130. This loop 133 is maintained by the action of photocell light sensor pairs 177, 178 the signals from which may be used alternately to energize and de-energize a drive motor for reel 132; or to cause such drive motor to alternately drive reel 132 at high and low speeds so as to maintain the feed loop 133. Within the apparatus 130, the chain 131 of insulators is intermittently advanced to a phase insulator inserting arbor 135 and individual insulators are subsequently inserted into stator core 90 as more fully described in the aforementioned Koenig application patent as well as in co-pending Miller and Kindig application Ser. No. 918,055, filed June 22, 1980, which issued Aug. 12, 1980 as U.S. Pat. No. 4,216,571, the disclosure of which is expressly incorporated herein by reference.

Still referring to FIG. 11, after individual insulators 134 are placed in the insertion arbor 135, the arbor 135 is elevated from the solid line position thereof shown in FIG. 11 to an operative transfer position (shown in phantom), the level of worktable 10, whereupon phase insulators are transferred from the arbor 135 to the stator core 90.

Within the apparatus 130, the chain 131 of insulators 134 is intermittently advanced, a leading end of a first insulator 134 is transferred into arbor 135 and the trailing end thereof is severed from the chain 131 along webs 136. Thereupon, arbor 135 is indexed (rotated) to receive the leading end of a second insulator, the above-described process being repeated. This process continues until the arbor 135 is loaded with the leading ends of a predetermined desired number of phase insulators. Thereupon, the trailing end portions of the insulators projecting from the arbor 135 are wrapped around the arbor and retained thereon preparatory to the arbor being raised for insertion into the bore of stator core 90. Upper and lower limit switches 137 and 138 are provided to control the upper and lower positioning of arbor 135. A shot pin actuating cylinder 139 operates a shot pin 142 against locator plate 141 to hold the arbor in the desired index position, while a feeler switch 142 cooperates with a switch plate 143 to stop the rotating arbor at a desired index position as will be described in greater detail subsequently.

This process of loading phase insulators into arbor 135 is a relatively slow process as compared to the rate at which it is desired to process stator cores through the automated system of the invention. For example, the arbor loading process just described may take as long as 21 seconds to complete while the loading/unloading processing time equivalent to the mean indexing time between adjacent work stations may be preferably in the range of 11-13 seconds. Another way of describing the means indexing time is in terms of the production rate of the system wherein it is desired to process stators through the complete system such that complete stators are available to be unloaded every 11-13 seconds. It will be appreciated that the longer insulator loading time of 21 seconds for apparatus 130 would prohibit the realization of the desired production rate of one stator every 11-13 seconds for the system. For this reason, in accordance with another feature of the invention, a pair of adjacent phase insulator insertion work stations 3 and 4 are provided. The pair of phase insulator work stations are suitably controlled such that, after arbor 135 in each station is fully loaded and worktable 10 has indexed twice to bring fresh stator cores 90 into each station, the arbors 135 are simultaneously actuated to be raised into the respective stator cores 90. After unloading of the phase insulators into the stator cores, the arbors 135 are lowered into solid line position of FIG. 11 for reloading of phase insulators onto the arbors 135. During the reloading process, of about 21 seconds in the example given, the worktable indexes twice, a total of 22-26 seconds in the example given, to bring two fresh stators into the phase insulator stations 3 and 4. It will be appreciated that while the phase insulator stations are continuing to reload for one of the indexing steps (and thus not inserting phase insulators into the stator cores) the remaining work stations 2, 5 and 6 are operative for each indexing step. In this way, the doubling up of the phase insulator work stations overcomes the adverse effect that the relatively slow insulator reloading time would otherwise have on the production rate of the system.

To enhance the automated feature of the system, it is desirable that as much flexibility as possible be provided under the control of the operator at the loading/unloading station 1 to be able to adapt the system to different stator core models. In this regard, it is known that the positioning of the phase insulators in the stator may be desired to be placed at certain preselected angular orientations depending on the motor designed involved. For example, it may be desired to have the flexibility to place the phase insulators at one of three possible angular orientations relative to a reference position on the stator core, such as 0°, +15°, or −15°. This is not readily accomplished by rotating the placement of the stator core 90 in the holding station 11 at the time of loading since the stator cores must all maintain the same orientation in the holding station 11 for proper processing at the press stations 2 and 6 as well as at wedge insulator insertion 5 (described subsequently) regardless of the desired angular orientation of the phase insulators in the stator core. For this reason and with reference to FIGS. 12 and 13, arbor indexing and locator apparatus is provided in accordance with a further aspect of the invention which permits the system operator to determine by means of a control switch on master control panel 30 the desired angular orientation of phase insulators in the stator core without the need to readjust settings on at the phase insulator insertion stations. In FIG. 12, the rotational position and action of guide rod 145 and tubes 146, 147 are controlled by the action of a gear 148 which meshes with a gear 149 and the rotary motion of which is imparted to rod 145 and tubes 146, 147. Moreover, tubes 146, 147 and rod 145 are free to slide upwardly and downwardly relative to frame member and a drive sleeve 151 attached thereto by means of a bearing 152. The outer race of bearing 152 is held fixed to the frame member 150 by means of a bearing retainer 153. The drive sleeve 151 is supported against axial movement at the bottom end thereof by a bearing 154, the outer race of which is held by means of a retainer 155 to the housing 156.

Figure 13:
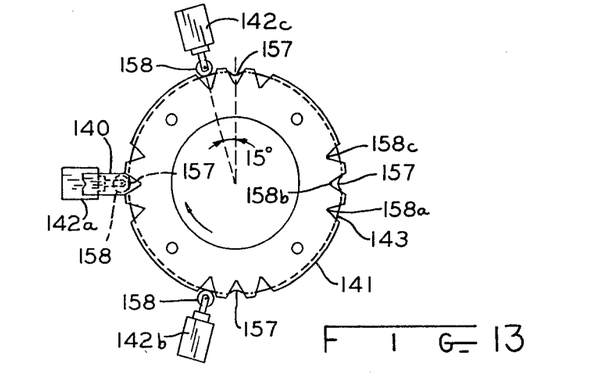
FIG. 13 is a detail plan view of locator and switch plate assembly useful in accordance with an aspect of the invention in the angular positioning of the phase insulator insertion arbor of the phase insulator work station of FIGS. 1 and 12.

Assembled with the drive sleeve 151 for movement therewith are the gear 149, a shot pin ring or locator plate 141, and a switch plate 143. As seen in FIG. 13, the switch plate 143 has four relieved areas 157 therein at equally spaced locations therearound, and when the spring loaded roller 158 of switch 142 moves into such depressions a signal is delivered to shot pin cylinder 139 which drives shot pin 140 forwardly into one of a triplet of shot pin openings which triplets are evenly spaced around the shot pin or locator plate 141. Although not shown in FIG. 12 but with reference to FIG. 13, three sensor switches 142a-c are angularly spaced and positioned about switch plate 143. The angular spacing between each of the sensor switches 142a, 142b and 142c is different from the spacing between successive stop recesses 157 by a predetermined amount, in this case 15° for a twenty four slotted stator core, which is equal to the desired preselectable angular orientations of the phase insulators in the arbor. A control switch at master control panel 30 is set to select the desired sensor switch 142a, 142b or 142c to cause a signal to be generated to stop the switch plate at the desired angular rotation of 0° (switch 142a), or +15° (switch 142b) or −15° (switch 142c). In operation sensor switch 142a is always in control of the position of drive sleeve 51 which in turn controls the arbor position during the part of the cycle when fresh insulation is being loaded into the arbor. In the illustrated embodiment, after four pieces of insulation 131 have been loaded into arbor 135, then the arbor rotates clockwise as viewed in FIG. 13 to permit the insulators 131 to be pushed against the arbor 135 by arms 179 (FIG. 11) which are actuated by a conventional cylinder (not shown). The preselected angular stopping position of arbor 135 with insulators 131 held against the outer surface of the arbor is determined by the angle selector index switch 142a, b, or c. The desired actuation of the selected switch was previously achieved by operating a standard selector switch (not shown) in control panel 30 by the machine operator prior to the loading of the four insulators in the exemplification. For purpose of illustration, it will be assumed that the desired angular position is −15° (switch 142c). To accomplish the desired stopping position, the roller of switch 142c drops into detent 157 whereupon the motor driving gear 148 is stopped by deenergizing the control valve of the hydraulic motor 180 of the gear 148. At the same time a signal is given for operation of a solenoid valve (not shown) to cause cylinder 139 to be actuated which in turn causes shot pin 140 to be driven forward into index plate notch 158c.

With the shot pin in notch 158c, a signal is given to close caps 181 around insulation 131 to retain the insulation against arbor 135. Another signal is given to release the arms 179 from the extended to a retracted position which in turn places the arms free from interference with operation of the arbor. At this time, the phase insulators 131 are ready for insertion into the selected core slots. More detailed explanation of the insertion of the insulations is available from the co-pending Fredrick Koenig patent application Ser. No. 91,081 previously identified.

After the insertion operation has been completed and the arbor 135 has been lowered to the position shown in FIG. 11, with the caps 181 in the open position, the shot pin 140 is retracted and the hydraulic motor 180 is energized to cause gear 148 to rotate arbor 135 to the loading position as dictated by index switch 142a. At this point the cycle is repeated.

The interior of drive sleeve 151 is machined to provide an internal keyway 160 and a key 161 disposed therein (and fastened to the drive sleeve 151 by screws as shown) projects into an external longitudinally extending keyway 162 that is formed along substantially the entire length of the tube 146. Thus rotational movement of the drive sleeve 151 is transmitted by means of key 161 to the tube 146 even though the tube 146 is free to move longitudinally relative to drive sleeve 151 because of the external keyway 162. The inner bore of the drive sleeve 151 is oversize relative to the outer diameter of tube 146, so a bronze bushing 163 (having an opening therein for accommodating key 161) provides a bearing surface along which the tube 146 may slide. A bronze bushing 164 is also carried at the upper end of tube 146, and this bushing provides a bearing surface along which the shaft 170, which is attached at its upper end to arbor 135, is free to both rotate and axially slide. The drive sleeve 151 and the flanges 165, 166 of the tubes 147, 146 are provided with holes along which the rods 145 extend, and these holes are sufficiently oversized relative to the outer diameter of the rods 145 that the rods 145 are free to slide axially therealong when desired. Thus it can be seen that with the arrangement as described, the desired angular orientation of the phase insulators on the stator core can be conveniently preselected simply by selection at the master control panel 30 of the particular sensor switch 142a, 142b or 142c which corresponds to the desired angular orientation.

With reference now to FIGS. 4, 5 and 13, the slot separator wedge insulator insertion station 5 will now be described. This station includes a reel 176 for providing a continuous supply of insulator material, such as polyethylene terephalate, to wedgemaker apparatus 171 suitably supported from top frame member 114 wherein wedge insulator pieces are formed for subsequent placement in the slots of the stator core by means of wedge insertion arbor 175. In general, the principles of the structure and operation of wedgemaker and wedge insertion apparatus is well known in the art as represented by the teachings of U.S. Pat. Nos. 3,579,818; 3,324,536; 3,831,255; 3,694,887; 3,972,568; and 4,026,009. Since the details of wedgemaker 171 and wedge insertion arbor 175 do not of themselves form a part of this invention, reference may be had to the disclosures of these patents, the subject matter of which is expressly incorporated herein by reference, for a necessary understanding of suitable equipment for use in the wedge insertion station 5.

As previously explained, the equipment for heavy press station 6 is essentially the same as that employed in initial press station 2 and it is, therefore, not considered necessary to repeat the description thereof for this purpose. However, it may be noted that since a heavy degree of pressure is to be applied to the wires and insulators in the core slots, it is necessary to use slightly larger press blades in the press arbor to achieve this result.

It will be appreciated from the foregoing that there has been described a novel and highly efficient automated system for the insertion of insulators and pressing of coil turns in the slots of a stator core of a dynamoelectric machine. The circular configuration of the worktable and the work stations positioned about the worktable provide a very compact and easily managed system that can be conveniently operated and controlled by a single operator. The use of a cuff support assembly as the positioning and holding means for the stator cores on the worktable provides an efficient mechanism offering the multiple benefits of precise orientation of the stator relative to the various work station with the assurance of firm retention in the worktable while at the same time conveniently offering desired support of the cuffs during the press operations. Moreover, the gauging of the phase insulator stations offers the benefit of achieving a relatively fast production rate despite the inherent fairly slow cycle for reloading of the insulator insertion arbor in each of the phase insulator work stations.

While there has been described what at present is considered to be a preferred embodiment of the invention, it will be understood by those skilled in the art that various changes and modifications thereof may be made without departing from the invention. It is therefore intended in the appended claims to cover all such changes and modifications that fall within the true spirit and scope of the invention.

What is claimed is:

1. An automatic system for compressing coil turns and inserting insulators in stator slots of a dynamoelectric machine comprising:

a movable worktable having a plurality of stator holding stations spaced about the worktable, the stators initially including slot liners terminating in end cuffs projecting from each end face of the stator and at least a first set of windings loosely inserted in the stator slots;

a plurality of work stations spaced about the worktable including (a) a combined loading/unloading station, (b) an initial press station for compressing coil turns in the stator slots and for clearing coil end turns from the vicinity of the stator bore, (c) at least one winding insulation insertion station, and (d) a heavy press station for further compressing the coil turns with the inserted insulation in the stator slots;

means for actuating the worktable to index the holding stations sequentially through the work stations in a repetitive manner;

a cuff support assembly means mounted on the worktable at each holding station for positioning and irremovably holding a stator loaded into each holding station while the stator is indexed through the various work stations;

and cuff support actuating means at the loading/unloading work station for engaging the cuff supports with the cuffs of a freshly loaded stator at the beginning of the indexing of the stator through the work stations and for disengaging the cuff supports from the stator cuffs after the stator has indexed through all the work stations so that the stator may be unloaded and a new stator loaded into the holding station.

2. The automatic system of claim 1 wherein the worktable is generally circular in configuration, the holding stations are located about the circumference of the worktable and the worktable actuating means rotates the worktable through its sequential index positions.

3. The automatic system of claim 1 wherein there is included at least one automated phase insulator insertion work station.

4. The automatic system of claim 1 wherein there is included an automated slot separator wedge insulator insertion work station.

5. The automatic system of claim 1 wherein there is included at least one automated phase insulator insertion work station and an automated slot separator wedge insulator insertion work station.

6. The automatic system of claim 1 in which there is included a plurality of adjacent phase insulator insertion work stations, each such work station having an arbor carrying the phase insulators and being insertable into the stator cores, the arbors being operative simultaneously to insert phase insulators into a corresponding plurality of adjacent stator cores; the phase insulator insertion work stations each also having a loading mechanism operative to reload the insertion arbor during the period of multiple worktable indexing steps when fresh stator cores are brought into position in the plurality of phase insulator insertion work stations.

7. The automatic system of claim 6 in which there are two phase insulator insertion work stations and the time required to reload each insertion arbor with phase insulators exceeds the index time of the worktable between adjacent work stations.

8. The automatic system of claim 6 in which the arbor reloading time is between 150% and 200% of the worktable index time between adjacent work stations.

9. The automatic system of claim 1 in which the press work stations include upper cuff support means operative to engage the upper cuffs of the stator before pressing of the windings in the slots is effected.

10. The automatic system of claim 9 in which the press work stations each include a press blade arbor positioned below the worktable and operative to be raised into the stator bore after all cuff supports have been engaged with the slot liner cuffs to assure maximum cuff support during the press operation.

11. The automatic system of claim 1 in which the cuff support assembly includes cuff support fingers extending at least partially into the holding station and serving as a support base for the stator when placed in the holding station.

12. The automatic system of claim 11 wherein the cuff support assembly includes a rotatable cam ring engaging the cuff support fingers, the cam ring has a cam follower extending therefrom; and wherein the cuff support actuating means includes a push-pull block having a cam follower engaging channel that engages said cam follower when the worktable indexes the corresponding holding station to the loading/unloading work station, and the actuating means further includes means to move the block and cam follower to cause rotation of the cam ring, thus causing the cuff support fingers to engage and disengage the cuffs of a stator placed in the holding station.

13. The automatic system of claim 12 in which the cuff support assembly and the cuff support actuating means are positioned below the worktable.

14. The automatic system of claim 1 wherein each holding station includes means for sensing the presence of a stator in the holding station and wherein switch means are provided at each work station, the switch means being responsive to the presence sensing means to enable actuation of the work station only when a stator is present in the holding station.

15. The automatic system of claim 1 including a safety cage surrounding and enclosing the system, the safety cage having a plurality of individually movable doors each providing access to a work station; a master work station control means positioned at the loading/unloading work station outside the safety cage; a plurality of set-up control means each positioned inside the safety cage for controlling the operation of a single work station; door sensing and control means for each access door and responsive to opening of an associated door for disabling normal control of all work stations from the master control means and for enabling operation of the respective work station only from the set-up control means for that work station.

16. The automatic system of claim 3 in which the phase insulator insertion work station includes a rotatable insulator insertion arbor means for inserting phase insulators into the stator at one of a plurality of different preselectable angular orientations; a rotatable index switch plate attached to the arbor and having a plurality of index stop means angularly spaced about the switch plate; a plurality of sensor means angularly spaced and positioned about the switch plate, the angular spacing of the sensor means being different from the angular spacing of the index stop means by an amount equal to the difference in the preselectable angular orientations of the phase insulators in the stator; and means to select the desired sensor means corresponding to the selected angular orientation of the phase insulators to position the insertion arbor at the selected angular position for insertion of the phase insulators.

17. An automatic system for compressing coil turns and inserting insulators in stator slots of a dynamoelectric machine comprising a slotted stator core having a bore therethrough, the system comprising:
   a movable worktable having a plurality of stator holding stations spaced about the worktable, the stators initially including slot liners and at least one set of windings loosely inserted in the stator slots;
   a plurality of work stations spaced about the worktable including, in sequence, (a) a combined loading/unloading station, (b) an initial press station for lightly compressing coil turns in the stator slots and clearing the stator bore of coil end turns, (c) a plurality of adjacent phase insulator stations, each such phase insulator work station having an arbor carrying the phase insulators and being insertable into the stator cores, the arbors being operative simultaneously to insert phase insulators into a corresponding plurality of stator cores positioned in adjacent holding stations, the phase insulator insertion stations each also having a loading mechanism operative to reload the insertion arbor during the period of multiple worktable indexing steps during which fresh stators are brought into position in the plurality of phase insulator stations, (d) a slot separator wedge insulator insertion station, and (e) a heavy press station for further compressing the coil turns with the inserted insulators in the stator slots,
   and means for actuating the worktable to index the holding stations sequentially through the work stations in a repetitive manner.

18. A method of automatically compressing wire segments in slots of a slotted stator core and of automatically inserting insulation segments in the slots, the method comprising the steps of:
   at a load/unload work station, placing the end face of the stator core onto cuff support fingers of a cuff support assembly mounted in a holding station located on a movable worktable;

actuating the cuff support fingers to engage the bottom cuffs of the stator core to irremovably hold the stator core in place during subsequent compressing and insulator insertion steps;

causing the worktable to rotate in a stepwise manner to index the stator sequentially through an initial press work station, a phase insulator insertion work station; a slot wedge insulator insertion work station and a heavy press work station and thereupon returning the stator to the load/unload work station;

and actuating the cuff support fingers to disengage the bottom cuff supports to permit unloading of the stator from the holding station preparatory to reloading the holding station with a fresh stator core.

19. The method of claim 18 wherein the stator core is provided with slot liner end cuffs projecting from both end faces of the stator core, the method including the step of, at the initial press station, engaging the upper cuffs with cuff supports and thereafter inserting a press blade arbor into the stator bore to press the wire segments in the stator slots toward the closed ends of the slots whereby wire contact with the arbor press blades is prevented until after the cuffs are all fully supported.

20. The method of claim 18 in which at least a pair of adjacent phase insulator work stations are provided, the method including the steps of repetitively loading successive holding stations on the worktable with said stator cores; indexing the worktable to position a fresh stator core in each of the adjacent phase insulator work stations; actuating each of the phase insulator work stations to simultaneously insert the phase insulators in the stator core, indexing the worktable to pass the phase insulated stator cores out of the phase insulator insertion work stations while a next set of fresh stator cores are brought into the phase insulator insertion work stations; and reloading the phase insulator insertion arbors of each of the work stations while the next set of stator cores are being brought into position in the adjacent phase insulator insertion work station.

21. An automatic system for compressing coil turns and inserting insulators in stator slots of a dynamoelectric machine comprising:

a movable worktable having a plurality of stator holding stations spaced about the worktable, the stators initially including slot liners terminating in end cuffs projecting from each end face of the stator and at least a first set of windings loosely inserted in the stator slots;

a plurality of work stations spaced about the worktable where operational procedures are performable, said procedures including loading, pressing, insulation inserting, and unloading; and said stations including stations for loading, for initially pressing and thereby compressing coil turns in the stator slots and for clearing coil end turns from the vicinity of the statore bore, for inserting winding insulation, for further compressing the coil turns with the inserted insulation in the stator slots, and for unloading;

means for actuating the worktable to index the holding stations through differently located work stations;

a cuff support assembly means mounted on the worktable at each holding station and for positioning and irremovably holding a stator loaded into each holding station while the stator is indexed through various work stations;

and cuff support actuating means at the loading and unloading work station for engaging the cuff supports with the cuffs of a freshly loaded stator at the beginning of the indexing of the stator through the work stations and for disengaging the cuff supports from the stator cuffs after the stator has indexed through all the work stations so that the stator may be unloaded and a new stator loaded into the holding station.

22. The automatic system of claim 21 wherein there is included at least one automated phase insulator insertion work station.

23. The automatic system of claim 21 wherein there is included an automated slot separator wedge insulator insertion work station.

24. The automatic system of claim 21 wherein there is included at least one automated phase insulator insertion work station and an automated slot separator wedge insulator insertion work station.

25. The automatic system of claim 21 in which the station for pressing includes upper cuff support means operative to engage the upper cuffs of the stator before pressing of the windings in the slots is effected.

26. The automatic system of claim 25 in which the pressing work station includes a press blade arbor positioned below the worktable and operative to be raised into the stator bore after all cuff supports have been engaged with the slot liner cuffs to assure maximum cuff support during the pressing operation.

27. The automatic system of claim 22 in which the phase insulator insertion work station includes a rotatable insulator insertion arbor means for inserting phase insulators into the stator at one of a plurality of different preselectable angular orientations; a rotatable index switch plate attached to the arbor and having a plurality of index stop means angularly spaced about the switch plate; a plurality of sensor means angularly spaced and positioned about the switch plate, the angular spacing of the sensor means being different from the angular spacing of the index stop means by an amount equal to the difference in the preselectable angular orientations of the phase insulators in the stator; and means to select the desired sensor means corresponding to the selected angular orientation of the phase insulators to position the insertion arbor at the selected angular position for insertion of the phase insulators.

28. A method of automatically compressing wire segments in slots of a slotted stator core and of automatically inserting insulation segments in the slots, the method comprising the steps of:

placing the end face of the stator core onto cuff support fingers of a cuff support assembly mounted in a holding station located on a movable worktable;

actuating the cuff support fingers to engage the bottom cuffs of the stator core to irremovably hold the stator core in place during subsequent steps;

causing the worktable to rotate in a stepwise manner to index the stator sequentially from one station to another and sequentially operating on the stator by initially pressing at least some of the wire segments placing phase insulators on the core, inserting slot wedge insulators, and heavy pressing at least some of the wire segments;

and actuating the cuff support fingers to disengage the bottom cuff supports to permit unloading of the stator from the holding station preparatory to reloading the holding station with a fresh stator core.

29. The method of claim 28 wherein the stator core is provided with slot liner end cuffs projecting from both end faces of the stator core, the method including the step of, at the station where initial pressing occurs, engaging the upper cuffs with cuff supports and thereafter inserting a press blade arbor into the stator bore to press the wire segments in the stator slots toward the closed ends of the slots whereby wire contact with the arbor press blades is prevented until after the cuffs are all fully supported.

* * * * *